United States Patent [19]

Furukawa

[11] Patent Number: 5,775,602
[45] Date of Patent: Jul. 7, 1998

[54] MANUFACTURING METHOD FOR A HYDROGEN-STORAGE-ALLOY POWDER FOR BATTERIES

[75] Inventor: Jun Furukawa, Iwaki, Japan

[73] Assignee: Furukawa Denchi Kabushiki Kaisha, Yokohama, Japan

[21] Appl. No.: 709,722

[22] Filed: Sep. 9, 1996

[30] Foreign Application Priority Data

Sep. 27, 1995 [JP] Japan ................................. 7-249629

[51] Int. Cl.$^6$ .......................... B02C 19/12; B02C 23/18
[52] U.S. Cl. ................. 241/16; 241/21; 241/22; 241/27; 241/29; 241/DIG. 14
[58] Field of Search ................. 241/12, 13, 16, 241/21, 27, 29, DIG. 14, 22

[56] References Cited

U.S. PATENT DOCUMENTS

| | | | |
|---|---|---|---|
| 3,434,699 | 3/1969 | Giambattista | 241/16 |
| 4,239,159 | 12/1980 | Johns | 241/29 X |
| 4,252,577 | 2/1981 | Malard | 241/16 X |
| 4,300,946 | 11/1981 | Simons | 241/27 X |
| 4,469,282 | 9/1984 | Booz | 241/16 |
| 4,643,361 | 2/1987 | Chapman | 241/16 |
| 4,893,756 | 1/1990 | Fetcenko et al. | 241/1 X |
| 5,143,560 | 9/1992 | Doser | 241/29 X |
| 5,429,887 | 7/1995 | Lyman et al. | 241/14 X |

FOREIGN PATENT DOCUMENTS

| | | | |
|---|---|---|---|
| 63-141258 | 6/1988 | Japan . | |
| 63-249302 | 10/1988 | Japan | 241/DIG. 14 |
| 3-263760 | 11/1991 | Japan . | |
| 6-246182 | 9/1994 | Japan | 241/DIG. 14 |
| 71-118704 | 5/1995 | Japan . | |
| 2169622 | 7/1986 | United Kingdom | 241/DIG. 14 |

OTHER PUBLICATIONS

J.J.G. Willems, Metal Hydride Electrodes Stability of LaNi$_5$Related Compounds, Philips Journal of Research, vol. 39, Suppl. No. 1, 1984, Netherlands, Abstract, Table of Contents and p. 1–94.

*Primary Examiner*—John M. Husar
*Attorney, Agent, or Firm*—Frishauf, Holtz, Goodman, Langer & Chick, P.C.

[57] ABSTRACT

A manufacturing method for a hydrogen-storage-alloy powder for batteries, which is a useful material for a negative electrode of a nickel-hydrogen secondary battery whose internal pressure in an overcharged state is low, the method comprising a process for crushing a hydrogen-storage-alloy ingot into a coarse alloy powder in a non-oxidizing atmosphere, and a process for mechanically grinding the coarse alloy powder in contact with an aqueous solution in which any one of salts including a sulfite, hydrogen phosphate, and dihydrogen phosphate is dissolved or with an aqueous alkali solution containing cobalt.

16 Claims, No Drawings

MANUFACTURING METHOD FOR A HYDROGEN-STORAGE-ALLOY POWDER FOR BATTERIES

BACKGROUND OF THE INVENTION

1. Field of the Invention

The present invention relates to a manufacturing method for a hydrogen-storage-alloy powder, and more specifically, to a manufacturing method for a hydrogen-storage-alloy powder, which, when used as a material for a negative electrode of a nickel-hydrogen secondary battery, can serve to restrain the increase of the internal pressure of the battery when the battery is overcharged.

2. Prior Art

Recently, nickel-hydrogen secondary batteries have become the object of public attention as high-capacitance alkaline secondary batteries.

The batteries of this type act with hydrogen as an active material for a negative electrode, and are manufactured and assembled in the following manner. A negative electrode (hydrogen-storage-alloy electrode) is formed by loading a current collector with a powder of a hydrogen-storage-alloy that can reversibly occlude and release hydrogen during charge/discharge operation. A positive electrode (nickel electrode) is formed by loading a current collector with a powder of nickel hydroxide that acts as an active material for a positive electrode. An electricity generating element is formed by arranging in layers these electrodes and an electrically insulating separator with liquid retention. This generating element is put into an electrically conductive casing, and the casing is injected with an alkaline electrolyte. Thereafter, the whole structure is sealed hermetically.

The assembled batteries are left to stand at normal temperature for a suitable period of time, and are then charged and discharged one to three times or thereabout under predetermined conditions, whereby the positive and negative electrodes are initially activated. Thereafter, the batteries are charged by applying current of a predetermined value, and then shipped.

Usually, the hydrogen-storage-alloy electrode used in one such battery is manufactured in the following manner.

First, a hydrogen-storage-alloy powder with given particle diameters, a conductor powder with given particle diameters, such as a carbonyl nickel powder, and a binder powder such as a polytetrafluoroethylene powder are mixed in predetermined ratios by weight, thereby forming a powder mixture.

Then, a viscous fluid compound slurry with fluidity is prepared by mixing the resulting powder mixture with a given amount of an aqueous solution of a thickener, which is obtained by dissolving a given amount of the thickener such as carboxymethylcellulose in ion-exchange water or distilled water.

The compound slurry is applied to or impregnated into a current collector, such as a punching nickel sheet, nickel net, or nickel foam with a three-dimensional reticulate structure, and the compound slurry is dried. Then, the whole resulting structure is rolled to cause the compound to be supported on the current collector, whereupon the intended hydrogen-storage-alloy electrode is obtained.

In the battery that uses the hydrogen-storage-alloy electrode formed in this manner, a absorption reaction occurs on the contact interface between the hydrogen-storage-alloy powder which is the principal constituent of the aforesaid compound slurry, and the alkaline electrolyte, and a battery reaction advances. More specifically, when the battery is charged, reduction occurs on the surface of the alloy powder such that hydrogen produced by electrolysis of water gets into and is occluded by the crystal lattice of the hydrogen-storage-alloy. When the battery is discharged, on the other hand, oxidation occurs such that the hydrogen occluded in the hydrogen-storage-alloy reacts with hydroxyl ions on the surface of the alloy powder, to be reconverted into water.

Generally, the hydrogen-storage-alloy powder is manufactured in the following manner.

In a vacuum or an inert gas atmosphere such as Ar, an ingot of the hydrogen-storage-alloy having a prescribed composition is first prepared by using, for example, a high-frequency induction furnace, and the resulting ingot is homogenized by heat-treatment.

Then, this ingot is crushed into a powder with suitable particle diameters by using a crusher, e.g., a jaw crusher. Thereafter, the resulting coarse alloy powder is pulverized to given particle diameters by means of, for example, a ball mill, whereupon a practicable powder is obtained.

An important problem of each grinding process, especially the process for pulverizing the coarse alloy powder, is that oxidation of the surface of the resulting alloy powder, which is active, easily advances with the progress of grinding, so that some treatment must be taken to counter the surface oxidation.

The reason for this is that since the oxidized surface of the alloy powder is partially deactivated, the aforesaid battery reaction cannot satisfactorily advance on the surface of the manufactured hydrogen-storage-alloy electrode.

Thus, in the case of a nickel-hydrogen secondary battery incorporating, as its negative electrode, the hydrogen-storage-alloy electrode that is manufactured with use of the alloy powder whose surface is oxidized, activation cannot fully advance in the aforesaid initial activation process. As a result, the high-rate discharge characteristics, especially those at low temperature, are lowered, and therefore, the cycle life performance is worsened.

In the case of the nickel-hydrogen secondary battery of this type, moreover, oxygen gas is generated from the positive electrode during the period between the last stage of charge and the time of overcharge. The oxygen gas is diffused in the alkaline electrolyte and passed through the separator to reach the hydrogen-storage-alloy electrode. If the aforesaid gas absorption reaction fails to occur appropriately on the surface of the hydrogen-storage-alloy electrode, the diffused oxygen gas cannot be reconverted into water. Accordingly, the pressure in the battery increases, and at the same time, the surface of the carried hydrogen-storage-alloy powder is oxidized to form a passive-state film. Inevitably, therefore, the hydrogen occluding capability of the hydrogen-storage-alloy powder is inhibited, and the internal pressure of the battery further increases.

These problems are aroused if the alloy powder undergoes surface oxidation. To prevent the surface oxidation, therefore, the conventional grinding process is carried out in a non-oxidizing atmosphere, such as an $N_2$ or Ar gas atmosphere, in general.

If the coarse alloy powder is pulverized into the practicable powder in such an atmosphere, however, the specific surface area of the resulting fine powder increases with the progress of the pulverization. In some cases, therefore, the fine powder is oxidized by a very small amount of oxygen being contained in the $N_2$ or Ar gas, whereby a firm oxide film may be formed on its surface.

In these circumstances, there has been proposed a method (see Jpn. Pat. Appln. KOKAI Publication No. 63-141258) in which an alloy is mechanically pulverized in ion exchange water or pulverized in an aqueous alkali solution, such as an aqueous solution of KOH, by using a ball mill, for example.

Even in the case where the alloy is pulverized in the ion exchange water or aqueous alkali, however, the surface of the powder obtained is also somewhat oxidized and deactivated. This is because oxygen is dissolved in the ion exchange water or aqueous alkali solution and it oxidizes the alloy surfaces that appear during the grinding process.

In the case where the alloy is ground in the ion exchange water or aqueous alkali solution, moreover, rare metal elements, for example, having segregated on the surfaces exposed during the grinding process, among other elements that constitute the hydrogen-storage-alloy, react with water to form a strongly alkaline atmosphere around the exposed surfaces, thereby accelerating elution of other essential components. This implies a change in properties of the alloy itself, resulting in deterioration of the properties of the battery to be manufactured.

OBJECTS AND SUMMARY OF THE INVENTION

An object of the present invention is to provide a manufacturing method for a hydrogen-storage-alloy powder for batteries, whereby surface oxidation of the alloy powder and elution of necessary alloy components can be restrained when the powder is prepared by grinding an ingot of a hydrogen-storage-alloy.

Another object of the invention is to provide a manufacturing method for a hydrogen-storage-alloy powder, whereby initial activation of an assembled battery can be advanced fully and an increase of the battery pressure in an overcharged state can be restrained.

Still another object of the invention is to provide a manufacturing method for a hydrogen-storage-alloy powder, whereby the high-rate discharge characteristics of a battery at low temperature can be improved.

In order to achieve the above objects, according to the present invention, there is provided a manufacturing method (hereinafter referred to as first manufacturing method) for a hydrogen-storage-alloy powder for batteries, which comprises: a process for crushing a hydrogen-storage-alloy ingot into a coarse alloy powder in a non-oxidizing atmosphere; and a process for mechanically grinding the coarse alloy powder in contact with an aqueous solution (hereinafter referred to as Group-A aqueous solution) in which any one of salts including a sulfite, hydrogen phosphate, and dihydrogen phosphate is dissolved.

According to the invention, moreover, there is provided a manufacturing method (hereinafter referred to as second manufacturing method) for a hydrogen-storage-alloy powder for batteries, which comprises: a process for crushing a hydrogen-storage-alloy ingot into a coarse alloy powder in a non-oxidizing atmosphere; and a process for mechanically grinding the coarse alloy powder in contact with an aqueous alkali solution (hereinafter referred to as Group-B aqueous solution) containing cobalt.

DETAILED DESCRIPTION OF THE INVENTIONS

In the first manufacturing method, any one of the salts dissolved in the Group-A aqueous solution serves as a reducing agent or buffer agent.

Accordingly, oxidation of the surfaces of an alloy by dissolved oxygen is restrained by the reducing effect of the salts, so that the alloy surfaces that appear during a grinding process cease to be oxidized. Also, these salts have a pH adjusting function. Even if rare metal elements in the alloy and water react in the grinding process so that the ambience of the alloy surfaces is changed to be strongly alkaline, therefore, the salts can restrain elution of other essential components by buffing the change, thereby preventing the alloy from changing its properties.

The Group-B aqueous solution used in the second manufacturing method is an alkaline solution. Therefore, the eluted components having segregated in the alloy are removed in advance, and Co compounds such as $Co(OH)_2$ are precipitated and form their respective films on the alloy surfaces that appear during the grinding process. Preferably, in order to cause $Co(OH)_2$ to precipitate, the pH value of the Group-B aqueous solution (alkaline solution) should be adjusted to 9 to 13. Any of those Co compounds are oxidized at a lower speed than the alloy surfaces, and are reduced to metallic cobalt in a charge process, which is carried out after a battery is assembled, so that the alloy surfaces never lose their necessary activity for a battery reaction. Accordingly, lowering of the performance of a hydrogen-storage-alloy electrode obtained can be restrained.

Either of the hydrogen-storage-alloy powders obtained by the first and second manufacturing methods is used as a a negative electrode material for negative electrode that restrains an increase of the internal pressure of the battery. The powder obtained by the first method is preferable, since it can accelerate the initial activation of a negative electrode.

According to the present invention, an ingot of the hydrogen-storage-alloy prepared by the conventional method is first crushed into a coarse alloy powder.

The particle diameters of the coarse alloy powder are not restricted in particular. If they are too large, however, pulverization in the next stage takes so much time that the grinding efficiency lowers. Normally, therefore, it is advisable to crush the ingot so that the average particle diameter is about 1 mm (16 meshes by Tyler screen) or less.

The crushing is carried out in a non-oxidizing atmosphere, e.g., an $N_2$ or an Ar gas atmosphere. At this time, oxygen, though in a very small amount, remains in the gas atmosphere, and may possibly oxidize the alloy surfaces. However, the particle diameters of the coarse alloy powder obtained in this process is relatively large, as mentioned before, so that the specific surface area of the powder is not so large. Even though the alloy surfaces are oxidized, therefore, a bad influence of such oxidation is negligible, compared to the percentage for active surfaces that are caused to appear by pulverization, which will be mentioned later.

According to the present invention, the coarse alloy powder thus obtained is pulverized into a practicable fine alloy powder in the following manner.

The coarse alloy powder is mechanically ground to given particle diameters in a manner such that it is in contact with the Group-A aqueous solution or Group-B aqueous alkali solution. Normally, the coarse powder is ground to a particle size of 150 meshes (by Tyler screen) or less.

Specifically, the coarse alloy powder is put into a ball mill in a manner such that it is immersed or soaked in the Group-A or -B aqueous solution, and the ball mill is operated for a predetermined time of grinding. Alternatively, a slurry composed of the coarse alloy powder and the Group-A or -B aqueous solution may be circulated in an attritor.

In this grinding process, the coarse alloy powder should be in contact with the Group-A or -B aqueous solution.

More specifically, this method is arranged so that the alloy surfaces that appear during the grinding process are always in contact with the Group-A or -B aqueous solution. In order to establish this state of contact, it is effective to perform the grinding process with the coarse alloy powder immersed entirely in the aqueous solution. If the aqueous solution is too much, however, the grinding efficiency is lowered. Normally, therefore, it is advisable to use the solution in a volume about twice to five times that of the coarse alloy powder.

Any of salts including a sulfite, hydrogen phosphate, and dihydrogen phosphate are dissolved in the Group-A aqueous solution used.

The sulfite may be a single salt or a suitable combination of two or more salts selected from a group including $K_2SO_3$, $Na_2SO_3$, etc., for example. $Na_2SO_3$, which has a strong reducing effect, is preferred in particular.

The hydrogen phosphate may be a single salt or a suitable combination of two or more salts selected from a group including $K_2HPO_4$, $Na_2HPO_4$, etc., for example. $Na_2HPO_4$ is preferred in particular.

The dihydrogen phosphate may be a single salt or a suitable combination of two or more salts selected from a group including $KH_2PO_4$, $NaH_2PO_4$, etc., for example. $NaH_2PO_4$ is preferred in particular.

If the salt concentration of the Group-A aqueous solution, with these salts dissolved therein, is too low, the reducing effect and pH adjusting function of the salts cannot be displayed fully effectively, so that the pulverized alloy powder is susceptible to surface oxidation, and the essential components are easily eluted. If the salt concentration is too high, in contrast with this, the remaining salts inevitably lower the activity of the nickel electrode of an assembled battery.

Preferably, therefore, the salt concentration of the Group-A aqueous solution is set within the range of about 0.1% to 2% by weight, depending on the kinds of the salts used.

The Group-B aqueous alkali solution used in the second manufacturing method is prepared by adding an aqueous alkali solution, which is composed of an aqueous solution of NaOH or KOH and ammonia water, to an aqueous solution that contains Co compounds, and then adjusting the pH value of the resulting solution within a predetermined range.

The Co compounds used may be $CoSO_4$, $Co(NO_3)_2$, or any other suitable compounds that dissolve in water. However, nitrate groups are not very desirable because they accelerate self-discharge of the nickel electrode.

If the pH value of the aqueous alkali solution is too low, gelled $Co(OH)_2$ is formed in the solution, so that $Co(OH)_2$ cannot easily adhere to the alloy surfaces, thus failing to produce an alkaline treatment effect. If the pH value becomes so high that the aqueous alkali solution is a strong alkali, Co ceases to be precipitated, and at the same time, necessary alloy components are eluted from the alloy surfaces that newly appear during the grinding process, resulting in lowering of the capability of the alloy. Normally, therefore, it is advisable to adjust the pH value to 9 to 13.

If the concentration of the Co compounds dissolved in the aqueous alkali solution is too low, the amounts of the Co compounds, such as $Co(OH)_2$, deposited on the alloy surfaces that appear during the grinding process become so small that the oxidation resistance of the alloy surfaces cannot be adequately improved, and the surface activity lowers. If the Co compound concentration is too high, in contrast with this, the deposited compounds are too much for satisfactory economical efficiency and easy control. Normally, therefore, it is advisable to adjust the concentration of the Co compounds dissolved in the aqueous alkali solution to 10% to 40% by weight.

By pulverizing the coarse alloy powder in this manner, the practicable fine alloy powder can be obtained without losing its surface activity.

According to the second manufacturing method described above, the crushing in the initial stage may be carried out in a dry process. Moreover, the second manufacturing method may be applied after the first manufacturing method is accomplished.

EXAMPLES 1 TO 6 AND COMPARATIVE EXAMPLES 1 AND 2

After a hydrogen-storage-alloy ingot having a composition given by $MmNi_{3.3}Co_{1.0}Mn_{0.4}Al_{0.3}$ (Mm=misch metal) was prepared by the vacuum arc melting method and the succesing heat-treatment, it was crushed in an $N_2$ gas atmosphere by using a jaw crusher, and the resulting powder were classified to form a coarse alloy powder with particle diameters of 1 mm or less.

Then, the coarse alloy powder and aqueous solutions shown in Table 1 were put into the ball mill, in the listed volume ratios, and the coarse powder was pulverized into an alloy powder of 150 meshes (by Tyler screen) or less at room temperature. The resulting alloy powder was left to coexist with the aqueous solution used, without being dried, in a manner such that 15 parts by weight of the aqueous solution was used compared to 100 parts by weight of the alloy powder.

Thereafter, an alloy slurry was prepared by adding 7 parts by weight of a 3% aqueous solution of carboxymethylcellulose, 2 parts by weight of polyvinylidene difluoride, and 10 parts by weight of an nickel powder to 100 parts by weight of the aforesaid alloy powder. After a punching nickel sheet (0.07 mm thick) with a 38% opening ratio was immersed in and pulled out of the alloy slurry, it was dried in the open air, rolled under a pressure of 20 tons/cm$^2$, and calcined at a temperature of 170° C., whereupon a hydrogen-storage-alloy electrode 0.37 mm thick was obtained.

A nickel electrode based on $Ni(OH)_2$ as its active material was manufactured by a conventional method, and size-AA nickel-hydrogen secondary batteries of 1,100-mAh rated capacity were assembled using the nickel electrode and the aforesaid hydrogen-storage-alloy electrode.

These batteries were subjected twice to 0.2-C charge and discharge for initial activation at 20° C.

After undergoing 150% 0.2-C charge at 20° C., the batteries were subjected to 3-C high-rate discharge at 0° C., and the resulting discharge capacities were measured.

The initially activated batteries were subjected to 450% 1-C overcharge at 20° C., and the resulting battery internal pressures of the resulting battery were measured.

Table 1 collectively shows the measurement results.

TABLE 1

| | Aqueous solution | | Ratio of aqueous solution to coarse alloy powder in crushing process (by volume) | Battery characteristics | |
|---|---|---|---|---|---|
| | Dissolved salt | Salt concentration (% by weight) | | Low-temperature high-rate discharge capacity (mAh) | Internal pressure of battery (MPa) |
| Example 1 | $Na_2SO_3$ | 0.1 | 3/1 | 300 | 0.7 |
| Example 2 | $Na_2SO_3$ | 0.5 | 3/1 | 300 | 0.7 |
| Example 3 | $Na_2SO_3$ | 1.0 | 3/1 | 280 | 0.8 |
| Example 4 | $Na_2SO_3$ | 2.0 | 3/1 | 200 | 1.0 |
| Example 5 | $Na_2HPO_4$ | 0.5 | 3/1 | 400 | 0.6 |
| Example 6 | $Na_2H_2PO_4$ | 0.5 | 3/1 | 320 | 0.8 |
| Comparative Example 1 | Ion exchange water only | — | 3/1 | 80 | 1.5 |
| Comparative Example 2 | $NaH_2PO_2$ | 0.5 | 3/1 | 160 | 1.3 |

As seen from Table 1, the batteries manufactured using the alloy powder prepared by the method according to the invention, compared to the batteries based on the comparative examples, are very excellent in high-rate discharge characteristics at low temperature, and their internal pressures in the overcharged state are extremely low.

EXAMPLES 7 TO 10 AND COMPARATIVE EXAMPLE 3

A coarse alloy powder prepared in the same manner as in Examples 1 to 6, along with aqueous solutions of $CoSO_4$ in concentrations shown in Table 2, was put into the ball mill, 25% ammonia water and a 1-N aqueous solution of NaOH were added, and the powder was pulverized in the state of controlling the pH values of the solutions from 9 to 13. The mixture ratios (by weight) of the solutions to the alloy powder were adjusted to 2:1 to 5:1.

The alloy powder thus obtained was washed in water, the amount of its $Co(OH)_2$ deposit was analyzed, and the weight ratio (%) of the deposit to the carried alloy powder was obtained. Then, size-AA nickel-hydrogen secondary batteries of 1,100-mAh rated capacity were assembled in the same manner as in Examples 1 to 6.

These batteries were subjected to initial activation and overcharge in the same conditions as in Examples 1 to 6, and the internal pressures of the battery were measured. Table 2 shows the measurement results.

For comparison, the internal pressure of a battery using an alloy powder pulverized in a pH-9 to -13 aqueous solution of NaOH only was measured. Table 2 also shows this measurement result.

TABLE 2

| | Amount of $Co(OH)_2$ deposit (% by weight) | Internal pressure of battery (MPa) |
|---|---|---|
| Example 7 | 0.2 | 0.7 |
| Example 8 | 0.5 | 0.5 |
| Example 9 | 1.0 | 0.4 |
| Example 10 | 2.0 | 0.4 |
| Comparative Example 3 | Aqueous solution of NaOH only | 1.2 |

As is evident from the above description, the nickel-hydrogen secondary batteries that incorporate, as their negative electrodes, the hydrogen-storage-alloy electrodes manufactured using the hydrogen-storage-alloy powder prepared by the method according to the invention are excellent in high-rate discharge characteristics at low temperature, and their internal pressures in the overcharged state are low.

This effect is obtained in the case where the coarse alloy powder is immersed in the aqueous solution or aqueous alkali solution having the reducing effect and pH adjusting function as it is pulverized into the practicable fine alloy powder, whereby the oxidation of the alloy surfaces and elution of the necessary alloy components are restrained.

What is claimed is:

1. A method for manufacturing a hydrogen-storage-alloy powder for batteries, comprising:

crushing a hydrogen-storage-alloy ingot into a coarse alloy powder in an non-oxidizing atmosphere; and mechanically grinding the coarse alloy powder in contact with an aqueous solution in which is dissolved at least one salt selected from the group consisting of a sulfite, hydrogen phosphate, and dihydrogen phosphate.

2. The method according to claim 1, wherein said non-oxidizing atmosphere is an $N_2$ gas atmosphere or an Ar gas atmosphere.

3. The method according to claim 2, wherein said coarse alloy powder is ground to a particle size of 150 mesh or less.

4. The method according to claim 3, wherein said aqueous solution consists essentially of a salt selected from the group consisting of $K_2SO_3$, $Na_2SO_3$, $K_2HPO_4$, $Na_2HPO_4$, $KH_2PO_4$ and $NaH_2PO_4$.

5. The method according to claim 4, wherein said salt in said aqueous solution is in a concentration of 0.1 to 2% by weight.

6. The method according to claim 5, wherein said salt is $Na_2SO_3$.

7. The method according to claim 1 wherein said salt is selected from the group consisting of $Na_2SO_3$, $Na_2HPO_4$, and $NaHPO_4$.

8. The method according to claim 1, wherein said coarse alloy powder is immersed in the aqueous solution such that the aqueous solution is in a volume twice to five times as much as said coarse alloy powder.

9. A method for manufacturing a hydrogen-storage-alloy powder for batteries, comprising:

crushing a hydrogen-storage-alloy ingot into a coarse alloy powder in an non-oxidizing atmosphere; and mechanically grinding the coarse alloy powder in contact with an aqueous alkali solution containing cobalt.

10. The method according to claim 9, wherein said non-oxidizing atmosphere is an $N_2$ gas atmosphere or an Ar gas atmosphere.

11. The method according to claim 9, wherein said aqueous alkali solution containing cobalt is an aqueous solution in which $CoSO_4$ is dissolved.

12. The method according to claim 9, wherein said aqueous alkali solution containing cobalt has a pH value of 9 to 13.

13. The method according to claim 9, wherein said aqueous alkali solution consists essentially of NaOH or KOH and ammonia water.

14. The method according to claim 13, wherein said aqueous alkali solution containing cobalt includes a cobalt compound selected from the group consisting of $CoSO_4$ and $Co(NO_3)_2$.

15. The method according to claim 14, wherein said aqueous alkali solution containing cobalt has a pH value of 9 to 13.

16. The method according to claim 15, wherein the cobalt compound dissolved in the aqueous alkali solution is in an amount of 10 to 40% by weight.

* * * * *